United States Patent [19]
Nozuyama

[11] Patent Number: 5,398,250
[45] Date of Patent: Mar. 14, 1995

[54] CIRCUIT FOR TESTING CIRCUIT BLOCKS CONTROLLED BY MICROINSTRUCTIONS

[75] Inventor: Yasuyuki Nozuyama, Tokyo, Japan

[73] Assignee: Kabushiki Kaisha Toshiba, Kawasaki, Japan

[21] Appl. No.: 266,112

[22] Filed: Jun. 27, 1994

Related U.S. Application Data

[63] Continuation of Ser. No. 990,940, Dec. 14, 1992, which is a continuation of Ser. No. 370,255, Jun. 22, 1989, abandoned.

[30] Foreign Application Priority Data

Jun. 22, 1988 [JP] Japan .................................. 63-154015

[51] Int. Cl.⁶ ............................................. G06F 11/00
[52] U.S. Cl. .................... 371/16.1; 371/22.3; 371/22.5
[58] Field of Search ............... 371/16.1, 22.3, 22.5, 371/22.6, 15.1

[56] References Cited

U.S. PATENT DOCUMENTS

| | | | |
|---|---|---|---|
| 3,603,936 | 9/1971 | Attwood | 371/16.1 |
| 3,786,434 | 1/1974 | Frye et al. | 340/172.5 |
| 4,305,125 | 12/1981 | Sato et al. | 364/200 |
| 4,313,200 | 1/1982 | Nishiura | 371/25.1 |
| 4,342,084 | 7/1982 | Sager et al. | 371/22.3 |
| 4,604,746 | 8/1986 | Blum | 371/22.3 |
| 4,621,363 | 11/1986 | Blum | 371/22.3 |
| 4,672,534 | 6/1987 | Kamiya | 371/16.1 |
| 4,697,267 | 9/1987 | Wakai | 371/22.3 |
| 4,710,927 | 12/1987 | Miller | 371/15.1 |
| 4,720,811 | 1/1988 | Yamaguchi et al. | 364/900 |
| 4,811,345 | 3/1989 | Johnson | 371/16.1 |
| 4,823,307 | 4/1989 | Melgara et al. | 371/16.1 |
| 4,876,645 | 10/1989 | Shioya et al. | 371/18 |
| 4,920,538 | 4/1990 | Chan et al. | 371/16.1 |
| 4,924,469 | 5/1990 | Tamaru et al. | 371/22.4 |
| 4,949,238 | 8/1990 | Kamiya | 364/200 |
| 5,043,985 | 8/1991 | Lin et al. | 371/22.3 |
| 5,077,740 | 12/1991 | Kanuma | 371/22.3 |

OTHER PUBLICATIONS

Guildford, Surrey, GB; Y. Nozuyama et al., "Design for Testability of a 32-bit TRON Microprocessor", *Microprocessors & Microsystems*, vol. 13, No. 1, Jan. 1989, pp. 17–27.

Electro '86 & Mini/Micro Northeast, No. 11, 1986, Conference Record, pp. 23/2, 1–19.

F. P. M. Beenker et al., "Macro Testing: Unifying IC and Board Test", *IEEE Design & Test of Computers*, vol. 3, No. 6, Dec. 1986, pp. 26–32.

European Search Report.

*Primary Examiner*—Charles E. Atkinson
*Assistant Examiner*—Ly V. Hua
*Attorney, Agent, or Firm*—Foley & Lardner

[57] ABSTRACT

The test circuit of this invention is used for testing the circuit blocks of an integrated circuit device controlled by microinstructions. The test circuit includes a microinstruction register. This test circuit holds both a microinstruction read out of a micro-ROM and a control signal set externally to test the circuit blocks of the integrated circuit device. The control signal set in the microinstruction register is decoded by a microdecoder to test the operations of the circuit blocks.

11 Claims, 3 Drawing Sheets

A CIRCUIT FOR TESTING CIRCUIT BLOCKS CONTROLLED BY MICROINSTRUCTIONS

This application is a continuation of application Ser. No. 07/990,940, filed Dec. 14, 1992, which is a continuation of Ser. No. 07/370,255, filed on Jun. 22, 1989, now abandoned.

BACKGROUND OF THE INVENTION

1. Field of the Invention

The present invention relates to a test circuit for testing the operation of circuit blocks that are controlled by microinstructions.

2. Description of the Prior Art

In a microprocessor, circuit blocks such as ALUs (Arithmetic Logic Units), shifters and register files are connected to each other through an internal bus and controlled with microinstructions. To efficiently test the operation of these circuit blocks from the outside of an LSI chip that contains the circuit blocks, a test circuit such as the one shown in FIG. 1 is conventionally used.

In FIG. 1, a macroblock 1 is a circuit block such as an ALU and a shifter that receives data from an internal bus 2 of a microprocessor via latch circuits 3 (LAT1 and LAT2). A macroblock 4 such as a register file directly receives data from the internal bus 2. Signals of the macroblocks 1 and 4 are outputted to the internal bus 2 via output buffers 5. The internal bus 2 is connected to a data pin 7 and an address pin 8 through I/O buffers 6. Data are inputted to and outputted from the circuit blocks 1 and 4 via the pins 7 and 8.

The macroblocks 1 and 4 are connected to circuits 9 (hereinafter called the TFF circuits). As will be explained later with reference to an equation, the TFF circuits 9 receive, under a normal mode, control signals from a control circuit previously assembled in the chip and provide the control signals to the macroblocks to let the macroblocks execute predetermined operations. Under a test mode, the TFF circuits 9 receive control signals from the outside of the chip and provide the control signals to the macroblocks to let the macroblocks execute operations to be tested. The latch circuits 3 of the macroblock 1, the macroblock 4, the output buffers 5 of the macroblocks 1 and 4 and the I/O buffers 6 are connected to bus line 2 and enabled or disabled by the circuits 10, respectively. The circuit 10 is similar to the circuit 9 and, therefore, it is also called the TFF circuit. An output of each of the TFF circuits 9 and 10 is determined according to the following equation in which the TFF circuits 9 and 10 are generally distinguished from each other with the use of a subscript "i" (or "j"):

$$(OUTPUT)i = \overline{MBT} \cdot SGN + MBT \cdot ENi \cdot Qi$$

In the expression, the MBT is an operation mode selection signal. When the signal MBT is 0, a normal mode is selected. When the signal MBT is 1, a test mode is selected.

The SGN is a control signal for the normal mode.

The ENi are enable signals for the respective TFF circuits 9 and 10 and generated by an enable signal generating circuit (TGEN) 11. The enable signal generating circuit 11 receives a sequence control signal TEN that controls a test sequence. The enable signals ENi to the TFF circuits are not necessarily different from each other. Depending on operations necessary for the test, a common enable signal may be used for a plurality of the TFF circuits.

The Qi are outputs of flip-flop circuits (FFs) arranged in the TFF circuits 9 and 10. The flip-flop circuits of the TFF circuits 9 and 10 are arranged to form a series scan chain. A Q-output of each of the flip-flop circuits is set to 0 or 1 in synchronism with a clock. When the signal MBT changes from 0 to 1, a logical value held at the Q-output at the time of this change of signal MBT is kept, while the signal MBT is maintained at 1.

If the signal ENi is applied to the TFF circuit 10(i) during a test period (with the Q-outputs of respective flip-flops having been set and with the signal MBT being 1) and if a signal Qi (fixed) of the flip-flop circuit of the TFF circuit 10(i) is 1, a circuit connected to the TFF circuit in question is enabled. If a signal ENi is applied to the TFF circuit 9(j) of the macroblocks 1 and 4, a control signal held in the TFF circuit 9(j) is applied to the macroblocks 1 and 4.

With the arrangement mentioned in the above, external data can be inputted to the macroblocks 1 and 4, and data can be read out of the macroblocks 1 and 4 to the outside to directly test operation of the macroblocks 1 and 4.

However, the conventional test circuit of this sort has problems.

For inputting control signals to the respective macroblocks, the TFF circuits shall be arranged for the macroblocks, respectively. This may require particular areas and wiring. Therefore, it is quite disadvantageous to install a conventional test circuit in an integrated circuit.

Moreover, it is impossible to test the macroblocks under operating conditions that are completely the same as actual operating conditions realized by control signals issued by a microdecoder.

SUMMARY OF THE INVENTION

An object of the present invention is to provide a test circuit having simpler structure and being easy to install in an integrated circuit.

Another object of the present invention is to provide a test circuit that can control the operation of respective macroblocks according to signals decoded by a microdecoder, similar to actual operation.

In order to accomplish the objects, a test circuit of the invention comprises a microinstruction register. The microinstruction register is basically the one originally provided in an integrated circuit device controlled with microinstructions. However, the microinstruction register of the invention holds not only a microinstruction read out of a micro-ROM but also a control signal that is set externally to test circuit blocks. The control signal set externally in the microinstruction register is decoded by a microdecoder that is already provided for normal operation, to directly provide control signals to test operation of the circuit blocks.

These and other objects, features and advantages of the present invention will be more apparent from the following detailed description of preferred embodiments in conjunction with the accompanying drawings.

DETAILED DESCRIPTION OF THE EMBODIMENTS

A test circuit according to an embodiment of the invention will be explained.

Figure 1:
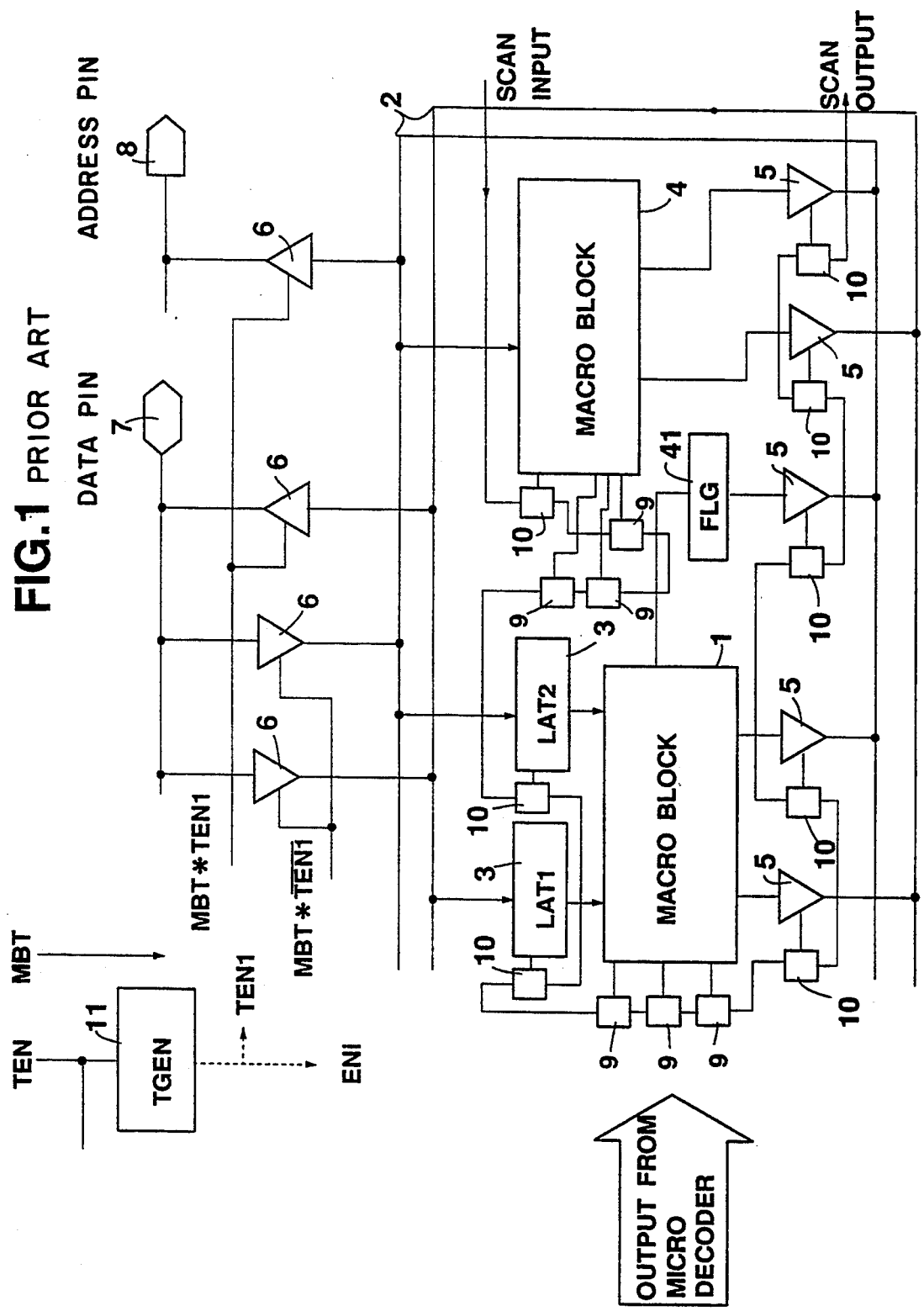
FIG. 1 is a view explaining a conventional test circuit.
Figure 2:
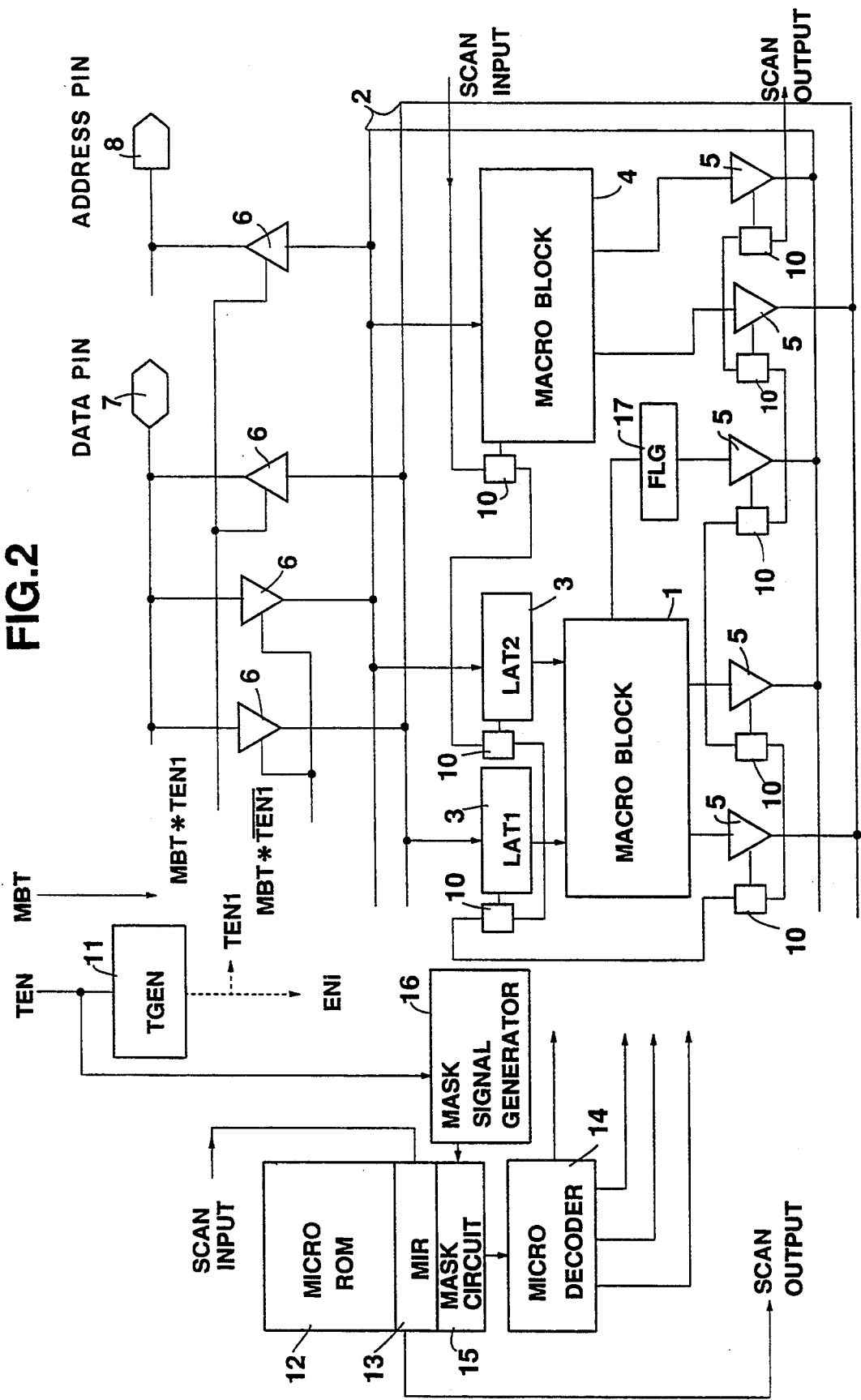
FIG. 2 is a block diagram showing a test circuit according to an embodiment of the invention.

Similar to the circuit shown in FIG. 1, a test circuit shown in FIG. 2 tests macroblocks such as ALUs and register files of a microprocessor. In FIG. 2, circuit elements similar to those shown in FIG. 1 are represented with like numerals.

In FIG. 2, the microprocessor has a micro-ROM 12, a microinstruction register (MIR) 13 and a microdecoder 14. The micro-ROM 12 is a read only memory for storing microinstructions that control the macroblocks.

The microinstruction register (MIR) 13 is a register in which a microinstruction read out of the micro-ROM 12 is set. According to the invention, the microinstruction register (MIR) 13 is so constituted that a microinstruction for controlling operation of the macroblocks is externally set in the MIR 13. In this embodiment, the microinstruction register (MIR) 13 comprises flip-flops (FFs) connected in series to form a scan chain. Control signals are sequentially inputted from a scan input terminal of the scan chain and set in the flip-flops. Similar to the TFF circuit 10, each bit of the microinstruction register (MIR) 13 holds a logical value that exists when the signal MBT changes from 0 to 1, during a period in which the signal MBT is maintained at 1 after it is changed from 0 to 1. However, while the signal MBT is being 0, a scan operation mode under which a microinstruction is set from the outside shall be distinguished from a normal mode under which the contents of the micro-ROM are stored.

The microdecoder 14 decodes a microinstruction set in the microinstruction register (MIR) 13. An output of the microdecoder 14 is sent to the macroblocks 1 and 4 to control operation of the macroblocks 1 and 4.

The masking circuit 15 validates or invalidates (enables or disables) a signal to be sent from the microinstruction register (MIR) 13 to the microdecoder 14. To validate the signal, the signal outputted from the MIR 13 may be inputted as it is to the microdecoder 14. To invalidate the signal, a microinstruction such as a NOP instruction (NO OPERATION instruction) having no effects on the control of the macroblocks to be tested is applied to the microdecoder 14 irrespective of the contents of the microinstruction register (MIR) 13. The masking signal generating circuit 16 generates the masking signal according to a test sequence control signal (TEN) that is given externally.

To operate the macroblocks 1 and 4 in a test sequence, the masking signal from the masking signal generating circuit 16 becomes inactive. Then, the control signal set in the microinstruction register (MIR) 13 is decoded by the microdecoder 14.

Similar to updating an output of the microinstruction register (MIR) 13, the masking signal is activated and inactivated in synchronism with clocks. Generally, the masking signal switches the validation and invalidation of the output of the MIR 13 at timing that is delayed little behind the timing of updating the MIR 13 under the normal mode. This delay may be reduced to an extent of practical negligence through circuitry devices. Accordingly, including a decoding time of microinstruction (control signal) under the normal mode, an operation speed of macroblocks installed in an LSI can correctly be evaluated.

An example of test sequence will be explained with reference to a timing chart of FIG. 3. In this example, the test circuit according to the embodiment puts external data in the macroblock (ALU) 1 to operate the data in the macroblock 1. A result of the operation is once stored in the macroblock (register file) 4. Then, the test circuit outputs the stored result to the outside.

Figure 3:
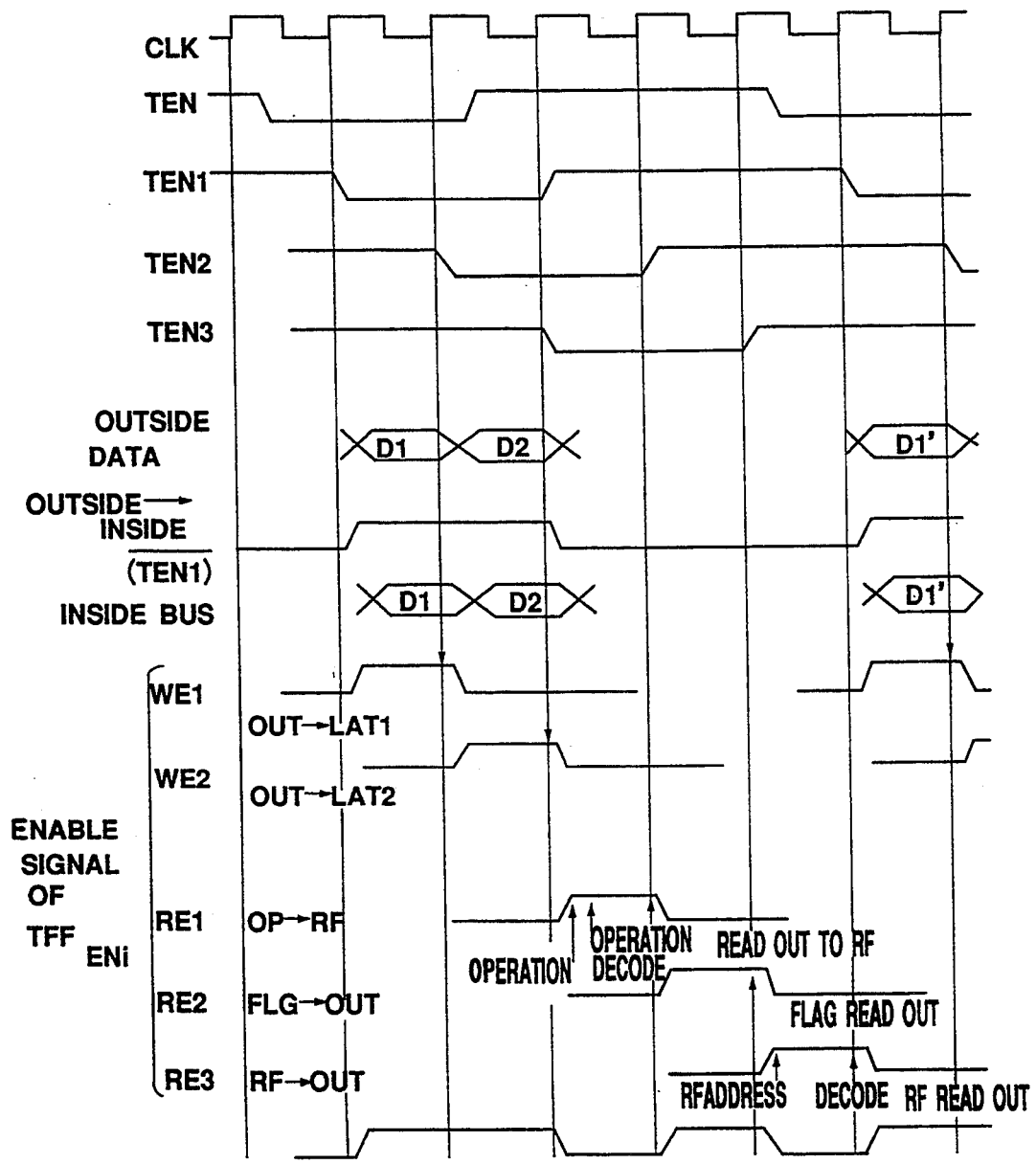
FIG. 3 is a timing chart showing operations of reading external data, operating the data in a macroblock 1, storing a result of the operation in a macroblock 4 and outputting the result outside.

Enable signals ENi (each corresponding to one of RE1, RE2, WE1, WE2 and WE3) shown in FIG. 3 are sent to TFF circuits 10. These enable signals ENi are generated in an enable signal generating circuit (TGEN) 11 by simply combining signals TEN1, TEN2 and TEN3. Based on a sequence control signal TEN applied to the enable signal generating circuit 11, flip-flops connected in series in the enable signal generating circuit 11 generate and output the signals TEN1, TEN2 and TEN3.

Firstly, the scan operation mode is set with the signal MBT being 0 and with the microinstruction register (MIR) 13 being under a scan operation status, and a microinstruction for specifying operation of the macroblocks 1 and 4 is inputted from the scan input terminal and set in the microinstruction register (MIR) 13. To enable the latch circuits 3 and output buffers 5 of the macroblock 1, the macroblock 4 and the output buffers 5 of the macroblock 4, the TFF circuits 10 for controlling them are set.

After that, the signal MBT is set to 1, and the signal TEN shown in FIG. 3 is applied. With the enable signal TEN1 of 1, data D1 is applied to a data pin 7. Then, the data D1 is inputted in an internal bus 2 via an I/O buffer 6. At this time, the enable signal WE1 becomes 1, and the data D1 on the internal bus 2 is put in the latch circuit (LAT1) 3. After that, data D2 is applied to the data pin 7. The enable signal TEN1 is kept to be 0 in the next cycle so that the data D2 is inputted to the internal bus 2. Also in this cycle, the enable signal WE2 becomes 1 so that the data D2 is taken in the latch circuit (LAT2) 3. During the reading of the data D1 and D2, the masking signal is kept to be 1 so that the microinstruction in the microinstruction register (MIR) 13 may be inhibited from being decoded.

After the data D1 and D2 have been read, the masking signal becomes 0. Then, the microinstruction in the microinstruction register (MIR) 13 is decoded by the microinstruction decoder 14 to provide a control signal that is applied to the macroblock 1. Then, the data D1 and D2 in the latch circuits 3 are operated in the macroblock 1. At the same time, the signal RE1 becomes 1 so that the output buffers 5 of the macroblock 1 and the macroblock (register file) 4 are enabled. A result of the operation in the macroblock 1 is stored in the macroblock 4 via the internal bus 2.

After that, the enable signal RE2 becomes 1 so that the statuses of flags of the operation stored in a flag register 17 are read from the pin 8 via the output buffers 5, internal bus 2 and I/O buffers 6.

Further, the enable signal RE3 becomes 1 so that the operation result (data portion) of the macroblock 1 stored in the macroblock 4 may be read outside from the pin 7 or 8 via the buffers 5, internal bus 2 and buffers 6.

With the signal MBT=1, a series of test sequences involving the data write from the outside, operation in the macroblock 1 and operation result (including flags)

read to the outside may be repeated with the use of different data (D1' and D2') to carry out necessary tests on the macroblock 1 precisely at high speed.

As described in the above, according to the test circuit of the invention, a microinstruction is externally set in the microinstruction register (MIR), and the control signal is decoded by the microdecoder to test operation of the macroblocks. Therefore, without interposing complicated control logic for converting machine language instructions into microinstructions, the circuit blocks controlled by microinstructions can be directly tested.

Since the microinstruction register (MIR) and microdecoder that are originally provided for a microprocessor are used to set a microinstruction in the MIR and decode the microinstruction in the microdecoder to provide a control signal for the macroblocks, the TFF circuits for applying control signals to the macroblocks of the conventional test circuit are not required in the invention. Therefore, the test circuit of the invention has a simpler structure and is easily installed in an integrated circuit.

If necessary control data are once set in the TFF circuits and in the microinstruction register (MIR) and if the test mode signal MBT is once set to 1, the test sequence control signal TEN is changed according to predetermined timing to repeatedly apply different data. Then, substantially under the same conditions as those of the normal mode in which a microinstruction set in the microinstruction register (MIR) is decoded by the microdecoder to control the operation of the macroblocks, the operation of the macroblocks can be tested with accuracy as required and at high speed.

What is claimed is:

1. An integrated logic circuit provided with a test circuit comprising a micro read only memory storing a plurality of microinstructions, a microinstruction register coupled with said micro read only memory for holding at least one microinstruction for a test, a micro decoder outputting control signals and coupled through a masking circuit with said register for decoding said microinstructions, a macro block connected with said micro decoder and controlled in accordance with control signals outputted from said decoder, an inner bus and data pins through which bus and pins data is inputted to and outputted from said macro block and gate circuits provided between said macro block and said bus in order to control the input and output of said macro block, said test circuit comprising:
    a scan test provided in said microinstruction register for inputting a bit pattern for a test of said microinstruction register; and
    a mask circuit provided between said micro decoder and said microinstruction register for selectively enabling and disabling an output of said register in synchronism with a test control signal for masking said microinstruction.

2. The test circuit as claimed in claim 1, wherein said macroinstruction holding means comprises flip-flop circuits connected in series to form a scan chain, microinstructions being supplied from an input terminal of the scan chain and set in said holding means.

3. The test circuit as claimed in claim 1, further comprising:
    a masking signal generating means for generating a masking signal according to a test sequence signal, the masking signal generating means connected to and controlling a masking means by operation of the masking signal.

4. The test circuit as claimed in claim 1, further comprising:
    signal generating means connected with circuit elements for operation of the circuit blocks under test, said signal generating means generating signals for enabling and disabling said circuit elements.

5. The test circuit as claimed in claim 4, wherein the signal generating means includes flip-flops connected to form a scan chain.

6. A test circuit for testing circuit blocks controlled with microinstructions, comprising:
    (a) storage means for storing said microinstructions;
    (b) holding means for holding a microinstruction read out of said storage means, said holding means permitting the microinstruction to be set in said holding means from the outside;
    (c) decoding means for decoding control signal data held in said holding means;
    (d) circuit blocks controlled with decoded signals decoded by said decoding means;
    (e) masking means for enabling and disabling a signal read out of said holding means and supplied to said decoding means in synchronism with a test control signal for masking said microinstruction; and
    (f) signal generating means for generating signals for enabling and disabling the circuit blocks tested and circuit elements used in the testing of the circuit blocks.

7. The test circuit as claimed in claim 6, wherein said holding means comprises flip-flop circuits connected in series to form a scan chain onto which the microinstruction is inputted through an input terminal of the scan chain and set in said holding means.

8. The test circuit as claimed in claim 6, further comprising:
    masking signal generating means for generating a masking signal according to a test sequence signal inputted from outside of the circuit blocks, the masking signal generating means connected to and controlling said masking means with the masking signal.

9. A test circuit for testing a plurality of macro blocks, comprising:
    a micro read only memory for storing a plurality of microinstructions to control the macro blocks;
    a microinstruction register, including flipflops connected in series to form a scan chain, for holding at least one of said microinstructions read out of said micro read only memory under a normal mode and a microinstruction set therein through said scan chain under a first test mode;
    a microdecoder coupled with said register for decoding a microinstruction output of said register and sending a control signal to said macro blocks to control operation of said macro blocks;
    a masking circuit connected between said register and said micro decoder for selectively releasing the contents of said register from a masking condition;
    an inner bus, data pins and address pins through which data is inputted and outputted to and from said macro blocks;
    gate circuits provided between said macro blocks and said bus in order to control input/output of said macro blocks; and
    a mask signal generator for generating a mask signal according to an external test sequence control signal and sending said mask signal to said masking circuit.

10. A semiconductor integrated circuit comprising:

a micro read only memory for storing microinstructions, a microinstruction register for holding at least one microinstruction, a microdecoder connected to said microinstruction register for decoding the microinstruction held in said microinstruction register to generate control signals for executing the microinstruction, a macro block for carrying out logic operations in accordance with said control signals by exchanging data through a bus; and a test circuit for testing said macro block when a test sequence control signal is given, said test circuit including:

a mask circuit connected between said micro instruction register and said microdecoder for masking the microinstruction held in said microinstruction register from said microdecoder;

a mask signal generator connected to said mask circuit in order to output a mask signal when said test sequence control signal is given, said mask circuit masking the microinstruction held in said microinstruction register in response to said mask signal and freely passing the microinstruction held in said microinstruction register when said test sequence control signal is not given;

means for outputting test data onto said bus; and a test enabling signal generating circuit for generating test enabling signals when said test sequence control signal is given, said test enabling signals controlling said test data outputting means to output test data onto said bus.

11. The semiconductor integrated circuit of claim 10 wherein said test circuit further includes a test scan path extending through said microinstruction register for setting a microinstruction suitable for test in said microinstruction register.

* * * * *